May 23, 1950     B. J. HOWARD     2,509,098

COMBINED STRAINER AND SUPPORT THEREFOR

Filed Oct. 22, 1947

Inventor
Bryan J. Howard

By Florian G. Miller
Attorney

Patented May 23, 1950

2,509,098

UNITED STATES PATENT OFFICE 2,509,098

COMBINED STRAINER AND SUPPORT THEREFOR

Bryan J. Howard, Venango Township, Erie County, Pa.

Application October 22, 1947, Serial No. 781,444

1 Claim. (Cl. 248—94)

This invention relates generally to a combined strainer and support therefor and more particularly to a combined strainer and a support member therefor for supporting a strainer in a vertical position over a milk cooler.

Dairymen now strain their milk in milk cans and the milk is subsequently poured into the milk cooler. By straining the milk in the milk cans, the milk remains warm over a considerable period of time thereby greatly increasing the bacteria content of the milk. Rehandling of the milk also requires more labor and expense and increases the liability of dirt and air borne bacteria entering therein. By providing a novel strainer on the milk cooler, milk may be poured into the cooler immediately after leaving the cows thereby providing a purer milk with a small bacteria count.

It is, accordingly, a particular object of applicant's invention to provide a novel combined strainer and support member therefor for disposal over the open top of a milk cooler which is simple in construction, economical in cost, light in weight, durable in construction, and efficient in use.

Another object of my invention is to provide a novel support for a strainer wherein milk may be strained directly into a milk cooler after leaving the cow.

Figure 1:
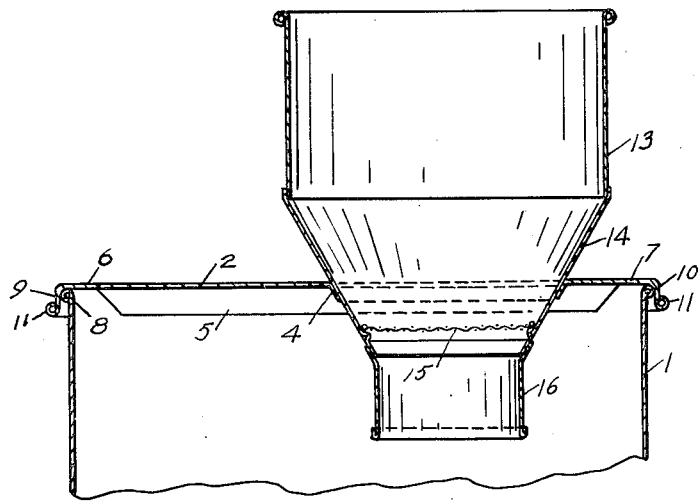
Figure 2:
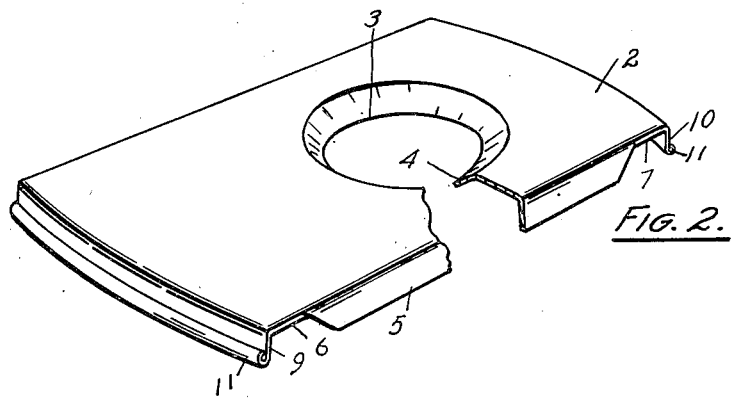

Other objects of my invention will become evident from the following detailed description, taken in conjunction with the accompanying drawings, in which Fig. 1 is a side elevational view of my novel combined strainer and support therefor; and Fig. 2 is a perspective view of my novel strainer support.

Referring now to the drawings, I show a fragmentary view of an open top 1 of a milk cooler (not shown) which is generally of elliptical shape, Fig. 1 showing a vertical sectional view taken transversely of the elliptical shaped container of the milk cooler.

My novel strainer support for my novel combined strainer and support therefor comprises a flat plate 2 having an aperture 3 formed therein with a tapered side 4. Depending marginal flanges 5 are formed on the lateral sides of the support plate 2, the depending flanges 5 terminating short of the ends of the plate 2 so that the underside of the plate at 6 and 7 engage the marginal bead 8 of the milk container 1. The outer ends of the plate 2 have depending flange portions 9 and 10 in arcuate configuration to conform to the arcuate configuration of the sides of the elliptical shaped container 1. The lower ends 11 of the flanges 9 and 10 are beaded.

The aperture 3 in the plate 2 is laterally offset from the center thereof so that a strainer 13 will be adjacent one side of the container 1 thereby permitting milk to be easily poured into the strainer 13 from one side of the container 1. The strainer 13 has a tapered portion 14 corresponding to the taper of the tapered marginal portion 4 of the aperture 3. A conventional screen 15 is disposed in the strainer 13 and the lower portion 16 of the strainer 13 has straight sides and depends a sufficient distance into the container 1 to prevent splashing and spilling of the milk over the sides of the container 1.

It will thus be seen from the foregoing description that the tapered portion 14 of the strainer 13 is engaged with the tapered side 4 of the aperture 3 in the support member 2 as shown in Fig. 1 wherein milk may be poured directly into the container 1 of the milk cooler thereby assuring the consumer of a clean and pure milk with a low bacteria count and furthermore, an extra step in the handling of the milk is eliminated.

The support member 2 is preferably stamped from a metal sheet and the tapered side 4 of the aperture 3 comprises a tapered flanged portion struck-out therefrom.

Various changes may be made in the specific embodiment of my invention without departing from the spirit thereof or from the scope of the appended claim.

What I claim is:

A unitary support member for a strainer having a tapered portion comprising a flat, substantially rectangular, metal member having a struck-out central aperture with a depending marginal tapered side adapted to receive the tapered portion of a strainer for upright support therein, depending lateral flanges on the sides of said flat member terminating short of the ends thereof, and depending end flanges for engaging the upper edges of the outer sides of a container.

BRYAN J. HOWARD.

REFERENCES CITED

The following references are of record in the file of this patent:

UNITED STATES PATENTS

| Number | Name | Date |
|---|---|---|
| 254,183 | Willard et al. | Feb. 28, 1882 |
| 419,551 | Philley | Jan. 14, 1890 |
| 1,015,946 | Ebner | Jan. 30, 1912 |
| 1,126,564 | Purinton | Jan. 26, 1915 |
| 1,293,297 | Anderson | Feb. 4, 1919 |
| 1,322,384 | Willard | Nov. 18, 1919 |
| 2,055,078 | Heffernan et al. | Sept. 22, 1936 |

FOREIGN PATENTS

| Number | Country | Date |
|---|---|---|
| 46,032 | Switzerland | Dec. 23, 1908 |